Patented May 20, 1930

1,759,369

UNITED STATES PATENT OFFICE

WILHELM QUERFURTH, OF BRUCHHAUSEN NEAR ARNSBERG, GERMANY, ASSIGNOR TO HOLZVERKOHLUNGS-INDUSTRIE AKTIEN-GESELLSCHAFT, OF KONSTANZ (BADENIA), GERMANY, A CORPORATION OF GERMANY

PROCESS FOR REFINING WOOD SPIRIT OILS

No Drawing. Application filed February 25, 1928, Serial No. 257,107, and in Germany March 3, 1927.

In the process of working up crude wood spirit to methanol (methyl alcohol) there are obtained as second runnings wood spirit oils—i. e. mixtures of substances of varying composition—which contain inter alia simple and mixed ketones of saturated and unsaturated character, saturated and unsaturated aliphatic aldehydes and alcohols, mesityloxide, phorone, sylvane and various other substances of unsaturated character, and, further, condensation products of high molecular weight and resinous substances of unknown composition, which wood spirit oils boil between 70° C. and 200° C. and have a specific gravity of 0.85 to 0.90.

In spite of their excellent solvent properties for cellulose derivatives, resins, oils, fats and the like, the wood spirit oils could not hitherto be employed for this purpose, as they are of dark yellow to brown color and have a very persistent unpleasant pungent smell.

According to the present invention it is possible to refine the wood spirit oils very considerably—i. e. to remove their dark color and smell—without detriment to their other valuable properties by passing them in vapor form preferably at temperatures above 300° C. for example between 400° C. and 500° C. over catalysts, which decompose or transform the evil smelling and coloured substances at high temperatures. Oxides of heavy metals, e. g. nickel oxide and the oxides of manganese, preferably in a finely divided condition form suitable catalysts for this purpose.

The action of the catalysts can be still further improved, by employing them on carriers, which, if necessary, can themselves also possess catalytic properties. Rusted spongy iron is an example of a good catalyst, as it contains a heavy metal oxide—iron oxide—in a finely divided condition on its surface. The action of the said spongy iron can be further improved by using it as a carrier for another catalyst—for example, manganese oxide. Especially good results are obtained if porous substances or substances having a large surface are employed, for example, active charcoal, pumice, silica gel or calcined bauxite. The choice of the catalyst must, of course, be determined by the composition of the wood spirit oils undergoing the refining process, with a view to obtaining the most favorable yields in each case.

Very efficient catalysts are, for example, obtained by impregnating spongy iron or pumice with a solution of nickel acetate or manganese acetate, drying, and heating in a current of air to 350° C. to 400° C.

After being in use for some time the catalysts lose their activity; they can, however, be easily re-activated by treating them at temperatures above 300° C., for example from 400° C. to 500° C., with oxidizing gases or vapors—for example, one of which is air. As the re-activating temperatures are the same as the reaction temperatures, the operation is for example advantageously conducted by alternately passing through the reaction chamber at about the same temperature the vapors of the wood spirit oils and air, and then air and steam, through the reaction chamber.

Owing to their varying composition all wood spirit oils can not be treated in the same manner. It is, for example, occasionally advantageous to dilute the vapors with other gases or vapors. In certain circumstances, for example, the operation can be effected by vaporizing the wood spirit oils by steam distillation. Occasionally it is desirable to moderate the violence of the reaction by dilution. A particularly favorable action is obtained by using hydrogen alone or mixed with other gases or vapors as the diluent, as the yield is generally favorably influenced in this way. Other gases which may be used as diluents and which are inactive under the process conditions are, for example, nitrogen and carbonic acid.

By this treatment the colored and evil smelling wood spirit oils are transformed into water-clear substances which have only a slight smell and which, if necessary, can be fractionally distilled.

In the process of refining, only a small percentage of the quantity employed is lost by decomposition into, on the one hand, difficultly volatilizable carbon-containing substances which are deposited on the catalysts and, on the other hand, gaseous products having a high hydrogen content.

*Examples*

1. Light wood-spirit oil (S. G.=0.86) having a very pungent odour and dark yellow color is passed in the form of vapor at about 450° C. through a tube charged with a catalyst of the afore mentioned nature, for example, spongy nickel-iron or spongy ferro-manganese. An oily conversion product is obtained which has a mild smell and, on distillation, yields water-clear pleasant smelling fractions.

2. Light wood-spirit oil (S. G.=0.86) having a very pungent odor and dark yellow colour is passed in the form of vapor together with hydrogen through a tube heated to 400° C.–480° C. and charged with spongy nickel-iron or spongy ferro-manganese. A conversion product is obtained, which on distillation, yields a water-clear pleasant smelling liquid. The conversion product can, if desired, be separated into several fractions by the usual methods.

What I claim is:—

1. In a process for refining wood-spirit oils, the step of passing wood-spirit oils in the form of vapor at temperatures above 300° C. in contact with heavy metal oxides.

2. A process for refining wood-spirit oils, which consists in the steps of vaporizing wood-spirit oils, heating said vapor to a temperature above 300° C., passing said heated vapors in contact with heavy metal oxides in a finely divided form, and condensing said vapors.

3. In a process for refining wood-spirit oils, the step of passing wood-spirit oils in the form of vapor at temperatures above 300° C. in contact with heavy metal oxides disposed on solid carriers.

4. In a process for refining wood-spirit oils, the step of passing wood-spirit oils in the form of vapor in contact with heavy metal oxides, said wood-spirit vapor being admixed with a diluent being inactive with said wood spirit vapor under the process conditions, said diluent being in a gaseous or vapor phase.

5. In a process for refining wood-spirit oils, the step of passing wood-spirit oils in the form of vapor in contact with heavy metal oxides, said wood-spirit oil vapor being admixed with hydrogen in diluent quantities.

6. In a process for refining wood-spirit oils, the step of passing wood spirit oils in the form of vapor at temperatures above 300° C. in contact with heavy metal oxides, said wood-spirit oil vapor being admixed with hydrogen and other gases which are inactive with said vapor in diluent quantities.

In testimony whereof I affix my signature.

WILHELM QUERFURTH.